United States Patent [19]

Paris

[11] Patent Number: 5,119,851
[45] Date of Patent: Jun. 9, 1992

[54] EQUIPMENT TO CARRY OUT MAINTENANACE OPERATIONS, PARTICULARLY WASHING, ON INSULATOR CHAINS OF HIGH VOLTAGE ELECTRIC LINES

[76] Inventor: Luigi Paris, Piazza di Spagna, 81, 00161 Rome, Italy

[21] Appl. No.: 397,535

[22] Filed: Aug. 23, 1989

[30] Foreign Application Priority Data

Aug. 26, 1988 [IT] Italy ................. 21770 A/88

[51] Int. Cl.$^5$ ............................................. B08B 3/02
[52] U.S. Cl. ......................................... 134/172; 15/246
[58] Field of Search .................. 174/139, 211; 134/172; 15/302, 345, 21.1, 246

[56] References Cited

U.S. PATENT DOCUMENTS

| 3,606,172 | 9/1971 | Sato et al. ............... 174/139 X |
| 4,388,487 | 6/1983 | Petrossian-Avakian ........ 174/139 X |

FOREIGN PATENT DOCUMENTS

| 335548 | 3/1977 | Austria . |
| 16801 | 7/1956 | Fed. Rep. of Germany ...... 174/211 |
| 1173008 | 6/1964 | Fed. Rep. of Germany ...... 174/139 |
| 2123203 | 8/1972 | Fed. Rep. of Germany . |
| 3508769 | 9/1986 | Fed. Rep. of Germany . |
| 2345231 | 10/1977 | France . |
| 59-108211 | 6/1984 | Japan . |
| 0176612 | 7/1989 | Japan ........................... 174/211 |
| 0176613 | 7/1989 | Japan ........................... 174/211 |
| 8706068 | 10/1987 | PCT Int'l Appl. . |

*Primary Examiner*—Philip R. Coe
*Attorney, Agent, or Firm*—Venable, Baetjer and Howard

[57] ABSTRACT

The invention relates to an equipment for the maintenance and particularly for the washing of insulator chains supporting high voltage electric lines, which allows operation on a live line. The washing of the insulator chain is performed through jets of washing fluid sprayed in close proximity to and over the whole contour of the insulators. The equipment comprises a guide body movable along the insulator chain, a plurality of washing liquid spraying nozzles mounted on said guide body, and moving means to guide said body along the insulator chain. This moving means consists of at least one track, rotating on two transmission rollers, at least one of these rollers being motor-driven and the active section of the track being in contact with the peripheral edge of the insulators of the chain. According to the invention, the guide body surrounds the insulator chain, at a short distance from the same insulators; the track presents a plurality of tongue teeth, projecting perpendicularly from its outer surface. The assembly of guide body and track has a plurality of contact points with the periphery of each insulator, distributed over the whole contour of the same insulators.

22 Claims, 5 Drawing Sheets

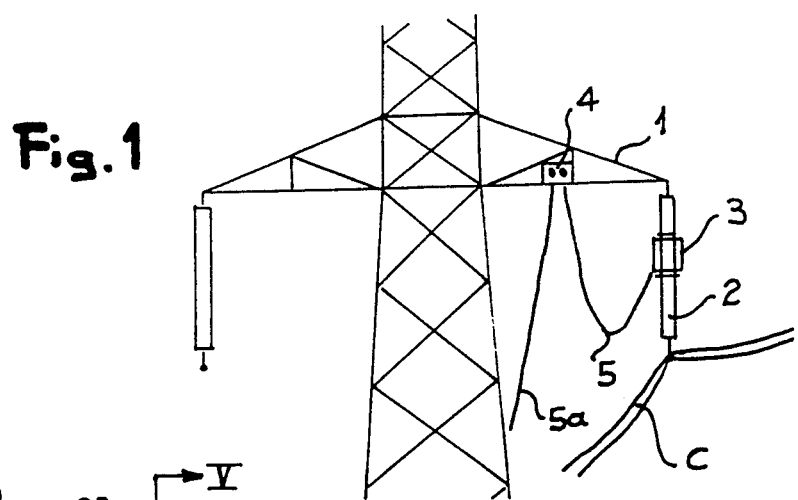
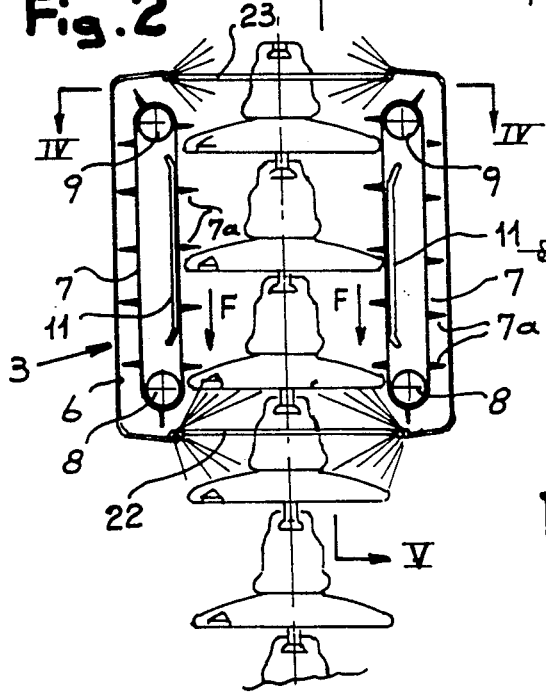
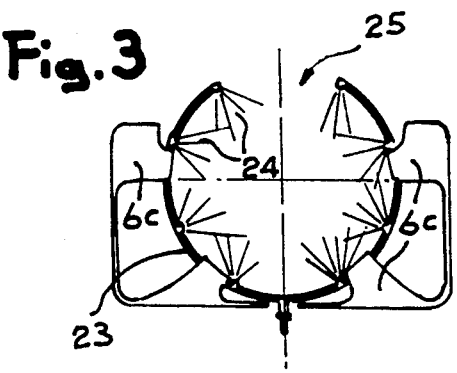
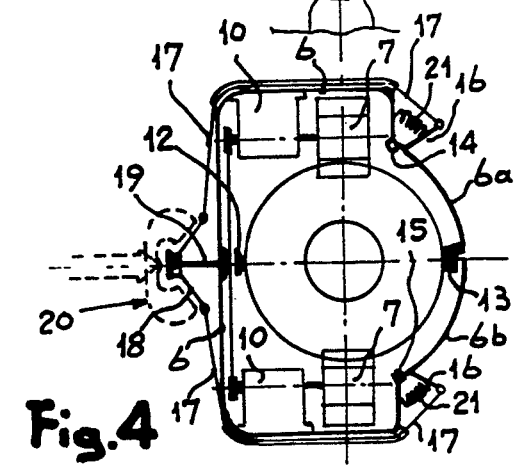

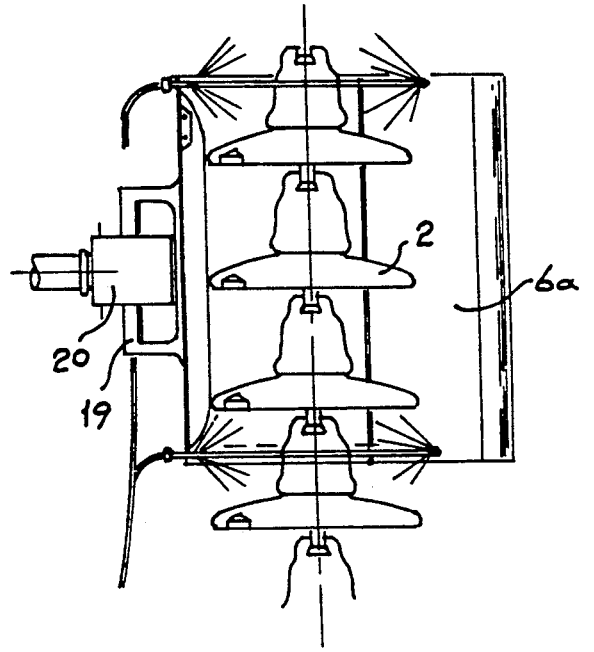
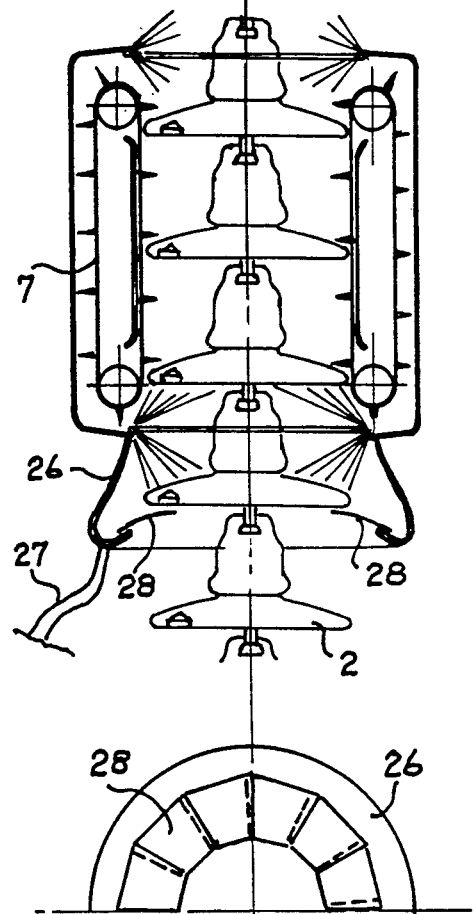
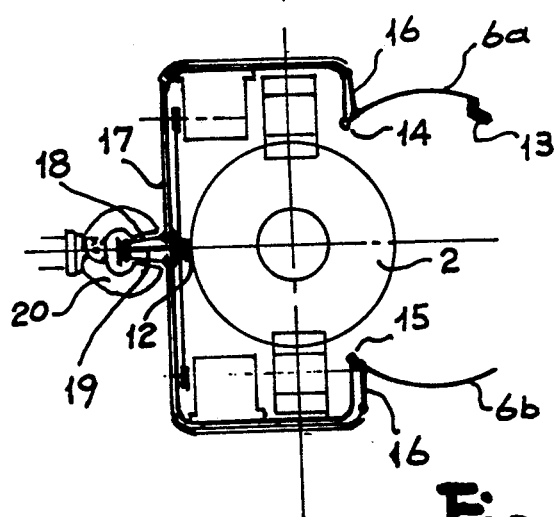

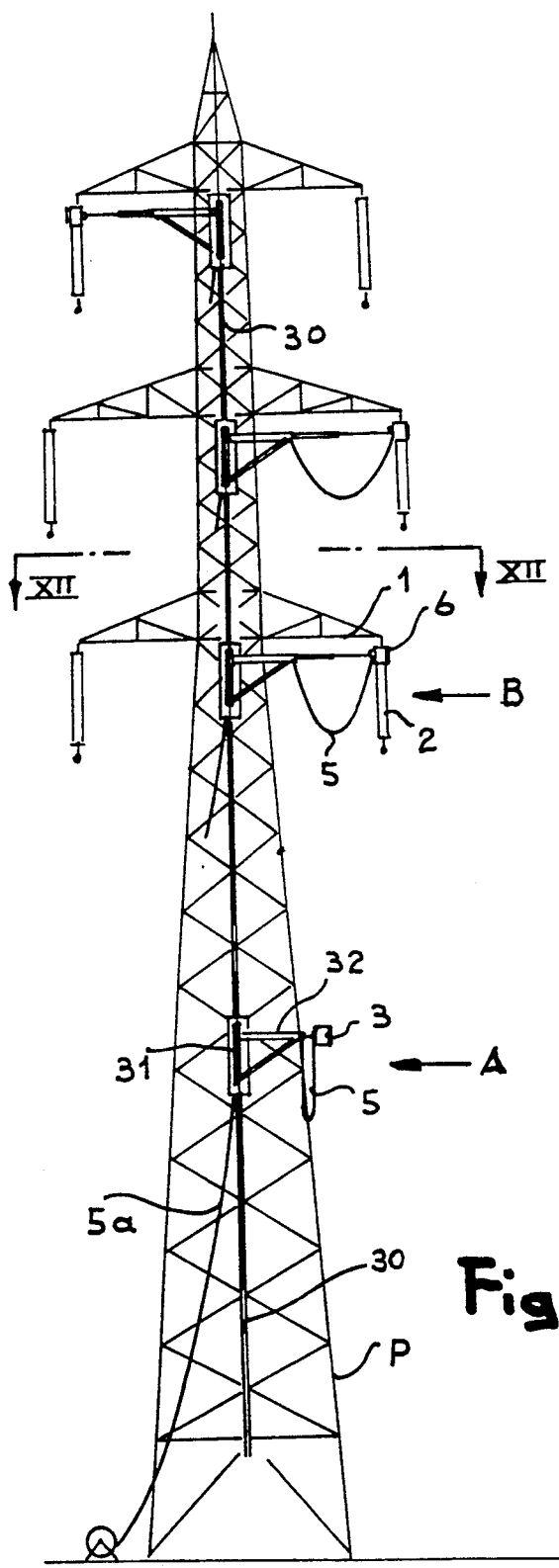
Fig. 10
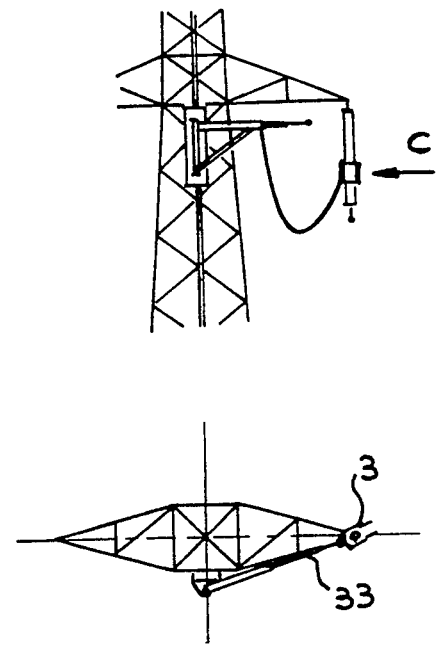
Fig. 11
Fig. 12

EQUIPMENT TO CARRY OUT MAINTENANCE OPERATIONS, PARTICULARLY WASHING, ON INSULATOR CHAINS OF HIGH VOLTAGE ELECTRIC LINES

FIELD OF THE INVENTION

The invention relates to an equipment suitable to carry out maintenance operations on insulator chains supporting high voltage overhead electric lines, and it is particularly suitable for these operations being carried out on a live electric line. With the term "insulator chains" we intend generally, in the present disclosure, any insulator assembly having a particularly elongated shape, such as a column insulator for electric stations, a bushing insulator or insulating shell for transforming stations, or the like.

In the following, we make reference more specifically to an equipment of this kind, which is particularly intended to washing operations of insulator chains, but it is intended that the invention should not be considered as being limited to this typical use.

It is known that the insulator chains, which are usually utilized in the open air, are subjected, in the areas with a mainly dry climate, to the settling of impurities and atmospheric dust, which are not always completely removed by the occasional action of rain. It is also known that, when the dirty surface of the insulator is wetted, or even just damped, mainly in coastal and subcoastal regions, where the polluting atmospheric dust is charged with sea-salts, a phenomenon of surface conductivity takes place in the insulator, with consequent electric discharges.

This phenomenon, which can be considered of little importance in very rainy regions, wherein the "washing" action of rains keeps the insulator sufficiently clean, on the contrary may cause serious service difficulties in insufficiently rainy regions, where sea-salts may accumulate on the insulators to a great extent.

At present, in order to avoid the said phenomenon of surface conductivity of insulators, maintenance operations are performed, consisting in a more or less frequent washing operation performed on insulators or insulator chains. In order to avoid a power blackout, these washing operations are normally performed on the live line.

DESCRIPTION OF THE PRIOR ART

A known equipment, which allows the washing of insulators on a live line, is described in the Italian Patent Application No. 19963 A/86 in the name of CANTAMESSA; it consists of a washing head, which is located on the insulator basis and comprises a plurality of washing nozzles suitable to spray washing liquid on any part of the insulator.

An equipment of this kind is essentially intended for the washing of insulators of low and medium voltage electric lines, i.e. insulators having relatively small dimensions, which can be fully embraced by the washing head. However, an arrangement of this kind is not fit for the washing of insulator chains of high voltage electric lines, which have a considerable length, even up to 5 m, and which cannot, therefore, be fully embraced by the above-mentioned washing head. Moreover, the axis of the insulator chain, when installed, often has a not perfectly straight shape, rather a variably arched one, and, for this reason too, the chain could not be embraced by an essentially straight and rigid shaped washing head.

A very simple washing device, which is, on the contrary, more suitable for insulator chains for high voltage lines, is that disclosed in DE-B1-2123203. Essentially, it comprises a tubular feed ring for washing fluid, supported on an operating rod, which can be directly actuated by an operator, and provided with a plurality of spraying nozzles. This ring is centred on the insulator chain and is caused to run along the same by an operator that lies on the pole bracket; at the same time, a pump feeds pressurized washing fluid to the spraying nozzles.

As it can be easily understood, such a system, in addition to being fully manual, obliges the operator to go up the pole bracket and operate the washing ring in very precarious conditions, as well as with a serious danger to himself.

From DE-A1-3508769 an insulator chain washing device is known, in which a group of rotating cleaning brushes is successively led in the vicinity of each bell in an insulator chain. Such a device presents a rather complicated structure with regards to the rotation system of the cleaning brushes, but its main drawback resides in that it can be employed only after turning off the power in the line (pag. 5, lines 24 to 27).

In the device according to AT-B-335548, a box-shaped body is provided, consisting of two parts, which can be closed on each other; between them the insulator is closed, in order to undergo a global washing operation. This device is essentially suitable for the washing of single insulators of low voltage lines. Although its use is foreseen for insulator chains too, in fact it is not apt to such a use for the same reasons mentioned in relation to IT-A-19963A86. Moreover, the insulation conditions which can be realized by such a body, between conducting wire and bracket supporting the insulator chain, are wholly insufficient to ensure safety operations on high voltage lines, if the washing operation has to be performed on a live line.

An improved equipment, which is, on the contrary, suitable to perform the washing of the insulator chains in a substantially automatic way, is disclosed in the Japanese Patent Application 217563/82 8 (Publication 59-108211) in the name of NGK. Essentially, it consists of a tracked carriage, apt to be disposed astride of and resting on a pair of parallel, essentially horizontal insulator chains, disposed side by side. The carriage carries a washing liquid tank, a pressure pump for said liquid and, at one of its ends, a plurality of washing liquid nozzles, spraying towards the insulators of said chains. The tracks of the carriage are driven by a motor associated to them, so as to cause the carriage to move along the pair of insulator chains, thereby the washing takes place progressively on all the insulators.

However, this equipment suffers from limitations of use, mainly owing to the fact that it can be utilized only when the insulator chains are disposed in parallel pairs, side by side, and, moreover, when these chains are oriented horizontally or nearly horizontally. A further limitation derives from the fact that washing nozzles are provided only at one end of the carriage, so that, when the carriage moves along the insulator chains, complete washing takes place only at the end of the chain corresponding to that of the carriage which is provided with washing nozzles, whereas the opposite end of the chain remains not perfectly washed for a length corresponding to the length of the carriage. Still another limitation derives from the fact that said equipment is relatively heavy, as it incorporates a washing fluid tank.

SUMMARY OF THE INVENTION

It is the object of the present invention to realize a maintenance equipment that eliminates these drawbacks and that is particularly apt to operate also on a single insulator chain, disposed anyhow, i.e. horizontal, skew and vertical, and particularly on a live electric line.

A further object of the invention is to realize said equipment so that it is suitable to perform maintenance operations also on insulators having a substantially truncated-cone shape, such as, e.g., station bushing insulators.

Still another object of the invention is to realize said equipment in the form of a washing device apt to perform the complete washing from end to end, of the insulator chain.

In order to achieve these objects, the maintenance equipment according to the invention is of the general kind comprising a guide body along the insulator chain and means to move the guide body along the insulator chain, said means consisting of at least one track, revolving on two transmission rollers, at least one of these rollers being motor-driven and the driving length of said track being in contact with the peripheral edge of the insulators of the chain. Said equipment is characterized essentially in that:

- the guide body surrounds the insulator chain, at a short distance from the insulators,
- said track has a plurality of tongue teeth, projecting perpendicularly from its outer surface,
- the unit of the guide body and track comprising a plurality of contact points with the periphery of each insulator, distributed over the whole contour of said insulators, and in that to said guide body there are associated operating means, apt to be remote-controlled and/or programmed.

According to a preferred embodiment, particularly suitable for maintenance operations on live lines, said operating means mounted on the guide body are fed by insulating fluid and a control unit is associated to said equipment, being connected thereto by means of a flexible pipe of insulating material, through said pipe flowing said insulating fluid.

In the case where the equipment is being used for washing operations of the insulator chain, said operating means consists of washing means, fed with an insulating washing fluid through said insulating pipe.

Moreover, said moving means comprises a hydraulic motor, which is in turn fed with an insulating motor fluid, through said insulating pipe.

According to an interesting characteristic of the invention, said tongue teeth projecting from the moving track are spaced apart along the track by en extent equal to a whole multiple or submultiple of the distance between the single insulators of the chain.

According to a further preferred characteristic of the invention, said guide body has a configuration essentially closed on the sides, so as to totally surround the insulator chain, and open at the bases, said body comprising a first fixed part surrounding at least half of the chain, and at least one movable part, surrounding the remaining part of the chain and being hinged to the first part, the second movable part opening like a window to allow the lateral access to the chain.

BRIEF DESCRIPTION OF THE DRAWINGS

However, further characteristics and advantages of the equipment according to the present invention appear more evident from the following detailed description of some preferred embodiments, which all refer, by way of nonlimiting examples of the invention, to washing equipments for insulator chains, illustrated in the annexed drawing, wherein:

FIG. 1 is a general diagram of the use of a washing equipment according to the invention;

FIG. 2 is a schematic side view, partly in section, of a washing equipment according to the invention, being employed on a chain of vertical insulators;

FIGS. 3, 4 and 5 show the same equipment of FIG. 2 in a schematic top view and in part sections along the lines IV—IV and V—V of FIG. 2, respectively;

FIGS. 6 and 7 are sections wholly similar to those of FIG. 4 and 5, however with washing assembly in phase of coupling with or releasing from an insulator chain;

FIG. 8 shows a different embodiment of the equipment according to the invention, in a similar view to that of FIG. 2;

FIG. 9 is a bottom scrap view of the embodiment of FIG. 8;

FIG. 10 is a schematic side view of a pole of a high voltage line, equipped with positioning means for the washing assembly according to the invention;

FIG. 11 shows a part of FIG. 10 with the washing assembly in working phase, after its positioning on the insulator chain;

FIG. 12 is a schematic plan view, along the line XII—XII of FIG. 10;

DESCRIPTION OF THE PREFERRED EMBODIMENTS

Figure 13:
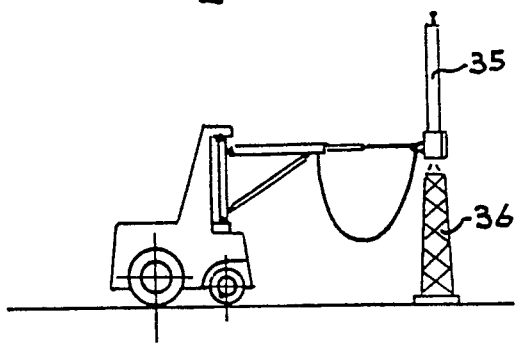
FIGS. 13 and 14 are schematic side views of a column insulator on which the washing assembly of the invention is in the phases of coupling and respectively washing.

As schematically represented in FIG. 1, an insulator chain 2 is anchored at the end of a bracket 1 of a line pole P (shown only in part), said chain hanging vertically downwards, and an electric line conductor being anchored at its lower end.

The washing equipment according to the invention comprises essentially a washing assembly 3, moving along the chain 2 in the way described in the following, and a feed and control unit 4 of said washing group, connected to the same through a flexible pipe 5. In this pipe passes at least one washing fluid feed line and one motor fluid feed tube. The feed unit 4 is not part of the present invention and, therefore, is not described in detail; we remark only that it is normally connected on the ground, to a washing liquid and motor fluid feed station (not shown) through an additional pipe 5a.

Since, as said, the equipment according to the invention is intended to perform washing with the electric line being live, so that it always exists a potential difference between the conductor C and the assembly 3 and between this and the grounded bracket 1, the pipe 5 is realized, according to an important characteristic of the invention, with a perfectly insulating structure. It shows, therefore, insulating characteristics, both as regards the tubes forming the pipe 5, and as regards the fluids flowing through said tubes (i.e. the washing fluid, generally consisting of demineralized water, and the motor fluid, which is generally oil or air), such as to ensure that no dielectric breakdown of any kind takes place when the assembly 3, moving towards the live part of the insulator chain, assumes the corresponding potential.

The washing assembly 3, as better shown in FIG. 2, comprises a guide body 6, which completely surrounds the insulator chain 2 and rests on several points of the lateral edges of the same insulators. This washing assembly has a height sufficient to ensure a stable and aligned guide; in the drawings, the height corresponds, e.g., to the height of a group of three insulator bells.

The guide body 6 consists essentially of a frame or case, laterally closed and open in correspondence with the bases. As it is evident also from FIG. 4, the frame 6 accomodates moving means in the form of tracks 7, revolving on transmission rollers 8, 9. At least one of these transmission rollers, e.g. the upper roller 9, is rotationally driven by a driving motor 10, which controls therefore the movement of the track 7. This motor 10 is of the kind operated by a fluid, and particularly, as said, by an insulating fluid, e.g. a hydraulic or compressed air motor.

When, as in the illustrated embodiment, two tracks 7 are provided, in diametrally opposed positions, it is absolutely necessary that they are rotated with a perfect synchronism, i.e. in such a way that their active sections, in contact with the insulator chain, move in the same direction and at the same speed. To this end, it is possible either to use two motors 10, one for each track, coupled through rotation synchronizing means (as schematized in FIG. 3), or one single motor, associated with a motion transmission towards the two rollers 9 of the respective tracks.

According to a basic characteristic of the present invention, the tracks are provided, on their outer surface, in contact with the insulator chain, with a plurality of tongue teeth 7a, projecting perpendicularly from said surface. In the embodiment shown in FIGS. 1 to 14 the spacing between teeth 7a is preferably a whole multiple of the distance between two adjacent bell insulators of the chain 2.

As clearly shown in FIG. 2, while the outer surface of the tracks applies against the peripheral edge of the insulators, the teeth 7a rest on the upper surface of the insulator bells. Thus, when the tracks are circulated in synchronism, e.g. in the direction indicated by the arrows F of FIG. 2, they "climb" practically along the insulator chain; if the circulation direction is opposite the arrows F, the tracks descend along the insulator chain.

In either case, the sliding of the tracks along the insulator chain is smooth, progressive and sure. In order to ensure that the tracks keep a sure rest against the insulator edge and then the tongues 7a surely rest on the upper surface of the same insulators, at the interior of track 7 a fixed plate 11 is provided, which bears against the inner surface of track 7. Alternatively to plate 11, a series of parallel bearing rollers could be provided.

The resting and centering of the guide body 6 on the insulator chain is ensured not only by the tracks 7, which press laterally in diametrally opposed positions, but also by simple bearing bars 12, 13, axially aligned and fixed to the frame 6 in positions at 90° with the resting positions of the tracks 7.

The guide body 6 has, as said, a closed configuration. However, in order to allow its coupling to the insulator chain, the guide body comprises two parts 6a, 6b hinged in 14 and 15 and opening like a book; when these parts 6a, 6b are open, as schematized in FIGS. 6 and 7, a window is opened in the frame 6, said window having dimensions sufficient to allow a lateral access for the insulator chain 2.

As it is evident from FIGS. 4 and 6, one of the guiding bars, and precisely the bar 13, is fixed to the free end of part 6a and, with the parts 6a and 6b being closed, superposes to the edge of the part 6b of frame 6.

A driving mechanism is provided, illustrated in FIGS. 4 and 6, to control the opening and closing movements of parts 6a and 6b. This mechanism comprises actuating arms 16, integral with each of the parts 6a, 6b. At the end of each arm 16 there is fixed a control cable 17 (such as BOWDEN cable), the other end of which is controlled by a control lever 18; the latter is hinged on a support upright 19 integral with body 6. When the body 6 must be transferred and led into engagement with an insulator chain 2, and to this end it is clamped by a clamping gripper 20, which clamps exactly on support 19, the gripper 20 causes at the same time the levers 18 to he actuated (in the way illustrated in FIGS. 4 and 6). Then these levers operate, by traction on cable 17, the opening of parts 6a, 6b.

When the body 6 has been led into engagement with an insulator chain, the gripper 20 is released and the parts 6a, 6b close on each other under the action of return springs 21. At this stage, the washing assembly can be considered as firmly engaged with the chain 2 and the gripper 20 can be removed.

In an alternative embodiment, the opening and closing movement of parts 6a and 6b can be achieved through actuators and position control means, known per se. A device like this need not being illustrated in detail, because it is widely known to those skilled in the art how to transform a driving mechanism like that illustrated in FIGS. 4 and 6 into a mechanism having electronic control actuators and position sensors.

Two distribution rings 22, 23 are associated to the opposed ends of the guide body 6, each ring carrying a plurality of spraying nozzles 24 uniformly distributed on the circumference. The use of two distribution rings, at both ends of body 6, is justified by the way of use of the washing equipment according to the invention, which is better described in the following.

A distribution ring 23 is represented schematically in FIG. 3, wherein it can be seen that the same is carried by rigid arms 6c which are fixed to the body 6. The ring 23, as well as the ring 22, presents an open configuration and the opening 25, as well as the window formed between the open parts 6a and 6b, serves to allow the passage of the insulator chain. In fact, the opening 25 has dimensions less than those of said window of body 6, however, it is sufficient to allow the passage of at least the insulator cap, which has, as it is known and evident from FIG. 2, dimension less than those of the insulator bell plate.

Alternatively, the rings 22, 23 too could be realized, as well as the elements 6a, 6b, with a fixed part and two hinged parts, or even they could be realized as a flexible tubular body. Anyhow, the rings 22, 23 are fed, as described above, each by its own tube, contained in the line 5 and connected to the control unit 4. Said tubes feed pressurized insulating washing fluid, e.g. demineralized water, to nozzles 24, which spray towards the insulator surfaces, in the way better described in the following.

The operation of the described equipment is as follows. The guide body 6 is first led, through the clamping gripper 20 clamped on the support upright 19, into engagement with the insulator chain 2, which passes through the window formed between the temporarily open parts 6a, 6b, and through the windows 25. Through the release of gripper 20, the closure of said parts 6a, 6b is obtained, and the guide body 6 is automatically centred and firmly applied on the chain 2. Even if the body 6 is not firmly engaged with the chain 2, but simply resting through the tracks 7 and bars 12, 13, a downward sliding of the guide body 6 is prevented only by the fact that the teeth 7a bears on the insulator bells and that the tracks 7 are being kept blocked.

When the guide body 6 is thus correctly applied on the chain 2, the tracks are caused to begin their motion. They "engage" with the insulator chain, as if this were a rack, thus causing the motion of the body 6 along said chain.

If the engagement of body 6 with chain 2 is performed in its upper part, the body 6 is first caused to go down to the lowest point of the chain, with the spraying nozzles being temporarily deactivated. In fact, for the reasons of electric insulation better described in the following, it is suitable to begin normally the washing operation of the chain from its lower part.

Thus when the body 6 is positioned in the lowest point of the chain, the washing group may now be started, up from below, activating on the meantime the lower washing ring 22. The washing of a large part of the chain is then performed, up from below.

Thus, as the washing group goes up, the water dripping downward along the chain 2 flows on insulator surfaces that have already been washed and are therefore no more conductive; therefore, there is no more the hazard of electric discharges on the lower insulators.

When the washing group has arrived to the upper end of the chain 2, the last insulator bells, for a height corresponding substantially to the height of the body 6, have not yet been washed. The upper distribution ring 23 is then activated and the motion of the washing group is inverted, causing it to descend along the chain until completion of the washing of all insulators.

Finally, the ring 23 too is deactivated and the motion is once more inverted to lead the washing group back to its upper starting position.

The sliding of the guide body 6 along the chain 2, down from above and vice-versa, may be repeated as many times as desired, according to the specific washing conditions and/or characteristics and adhesion of the deposited impurities to be removed.

In order to take into account the fact that the washing fluid dripping along the insulator chain may be, itself, slightly conductive, even if to a very little extent, practically corresponding at most to the quantity of conductive impurities accumulated on one insulator bell, and then in order to avoid, even more safely, the hazard of electric discharges through the dripping water, according to the embodiment of FIGS. 8 and 9, it is provided to employ a collecting gutter 26 in proximity to the lower part of body 6, immediately under the distribution ring 22. The collecting gutter 26 is connected to a discharge tube 27. The circular-shaped gutter 26 has a diameter greater than that of the insulators, in order to allow the free passage of them; along its edge, however, there are fixed flexible tongues, e.g. made from rubber, which extend towards the interior of the great circumference of the insulators. Therefore, these tongues are able, on one hand, to convey the dripping washing fluid into the gutter 26 and, on the other hand, to bend when they pass in proximity of the insulator edge.

This embodiment is particularly of interest in the case of the use of an expensive or polluting washing fluid, which can then be recovered in the most part.

Figure 16:
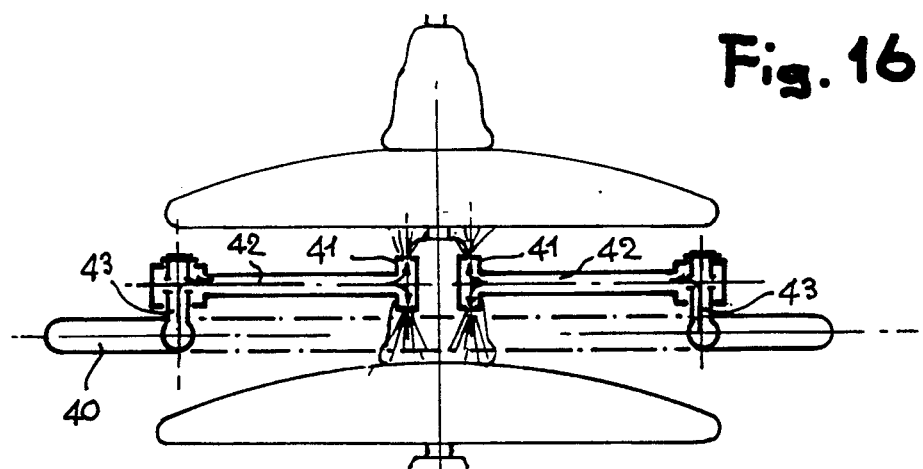
FIGS. 16 and 17 show, in plan and elevation respectively, an alternative embodiment of the distribution rings and washing nozzles.
Figure 17:
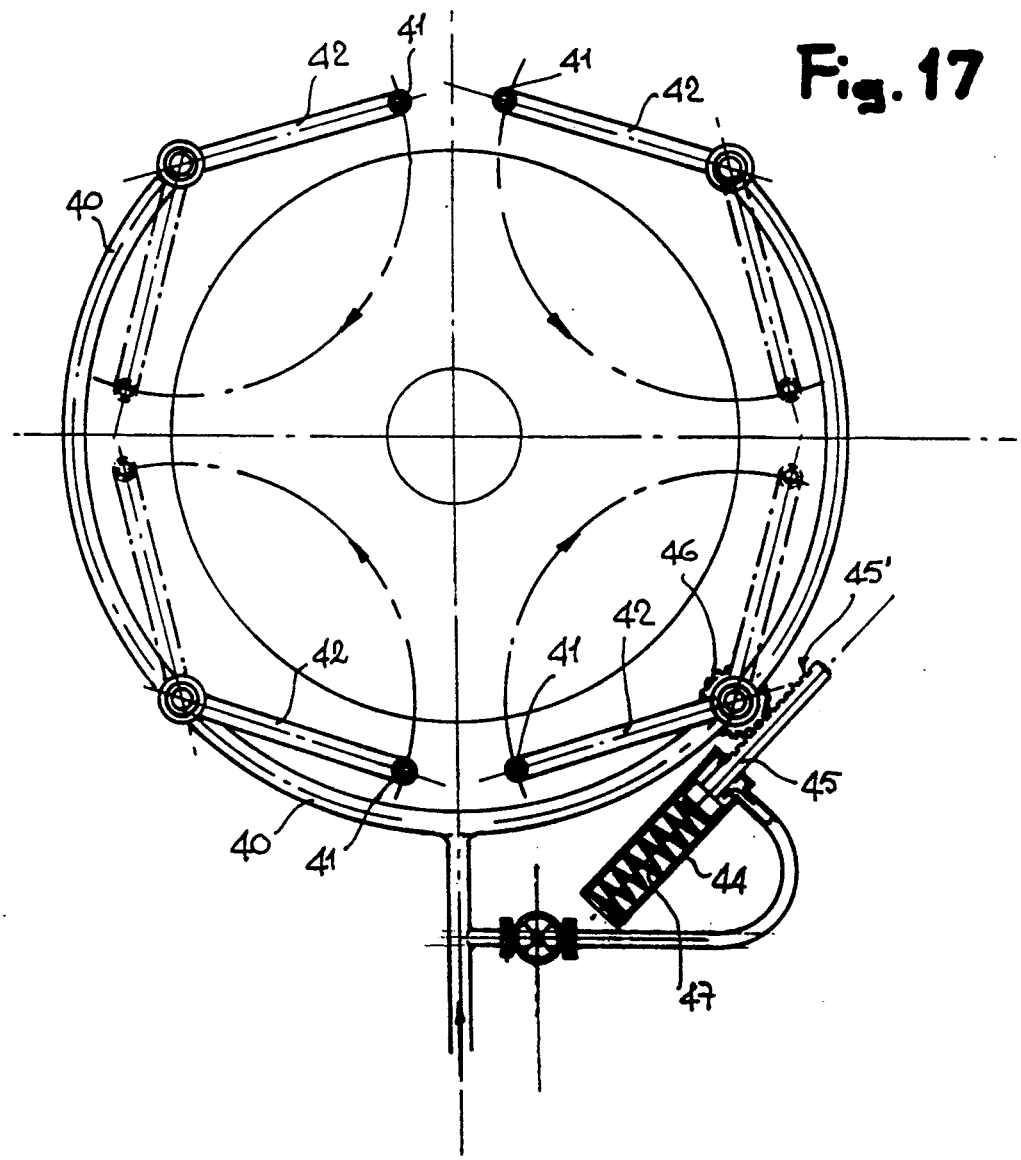

FIGS. 16 and 17 show a different embodiment of the distribution rings 40 and relative spraying nozzles. As shown by the drawings, the spraying nozzles are carried at the ends of arms 42, which are hinged on vertical hollow pins 43, around which they can swing, rotating in the horizontal plane.

This rotation is controlled through a cylinder/piston 44, in which the external part of the piston rod 45 is in the form of a rack 45'; this rack engages with a gearwheel 46 integral with the hub of the arm 42. When the pressurized water is fed to the distribution ring 40, it comes also into the cylinder 44 and actuates the coming in of the piston rod 45; the teeth of the rack 45' drive the wheel 46 and then cause the arm 42 to swing. When the pressurized water feed stops, the piston is led back to its rest position by a spring 47 located in cylinder 44.

The control through cylinder 44 and rod 45, 45' is normally provided in relation to only one of the arms 42; for the rotation of the other arms, a belt or chain drive can be provided, which interconnects all of them.

As it can be clearly understood from the drawings, the arms 42 are kept adjacent to the distribution rings 40 when the washing group is moving along the insulator chain. When the group is stopped for the washing operation, the arms 42 oscillate swing in the horizontal plane and cause the spraying nozzles 41 to run along an arc which passes in the internal space between an insulator bell and the other, so as to perform a perfect washing operation.

FIGS. 10 and 12 show an example of an electric line pole equipped for the full automation of the washing operation. In fact, along the median line of one side of the pole, a rail 30 is fixed, which runs up to the level of the top bracket of the pole. Sliding along this rail, a carriage 31 is mounted, which carries a bracket 32.

The bracket 32 is mounted rotating, of an angle greater than 180°, around a vertical axis of the carriage 31, in such a way that it can be led into contact with either of the opposed bracket of the pole, as it is clearly shown by the plan view of FIG. 12.

In this embodiment, the above-mentioned control unit 4 is either mounted on the bracket 32, or incorporated in the carriage 31. As said, the control unit 4 is normally connected to the ground through a feed pipe 5a. Anyhow, the already mentioned pipe 5 branches from the control unit 4, towards the washing group 3.

The group 3 is carried by the gripper (not shown in the FIGS. 10 to 12 in order to avoid unnecessary complications, which is fixed at the end of a telescopic rod 33 carried by the bracket 32, e.g. the rod of a hydraulic piston, the gripper 20 supporting the guide body 6 in an easily detachable way.

The operation of this assembly can be easily understood. The carriage 31 is caused to slide along the rail 30 in the closed configuration shown at position A of FIG. 10, until the bracket is led substantially to the level of a bracket of the pole, and then stopped there. Then the outward sliding of arm 33 is operated, until the guide body 6, with its parts 6a, 6b open, is led into engagement with the insulator chain 2 (position B). The release of the gripper 20 supporting the body 6 is then operated, and simultaneously the closing of parts 6a, 6b. When the guide body 6 is firmly engaged with the chain 2, the movable arm 33 is retracted (position C). Then the above-described washing operation is initiated.

For the washing of an insulator chain 2 hanging from a bracket 1 of a pole P, the working sequence can be resumed as follows:

engagement of group 3 with the top of chain 2 descent of group 3 to the lower end of the chain, with the washing nozzles being deactivated ascent of group 3 to the top of the chain, with the lower washing nozzles being activated further descent of group 3 with deactivated lower nozzles and activated upper nozzles, for a section of the chain corresponding substantially to the height of the same group 3 further ascent of group 3 to the top of the chain, with all washing nozzles being deactivated release of group 3 from the chain.

For the last operation, the guide body 6, led again to the position of the chain, wherein it had been left, is clamped again by the clamping gripper 20, carried by the arm 33 in position of engagement: the gripper 2 is clamped, the parts 6a, 6b of the frame 6 are opened, and the group 3 is released from the chain 2.

The operation is repeated for each of the chains changing from each of the brackets of pole P. At the end, the carriage 31 is caused to slide again along the rail 30, down to the ground or to a safety position.

Though, in the embodiment illustrated in FIGS. 10 to 12, a rail 30 is provided, associated with each pole of the line, an alternative embodiment is possible, in which the carriage 31 can move, not on a suitable rail, but directly along the trestle of pole P. However, the specific structure of a self-propelled carriage of this kind is not in the scope of the present invention and is not, therefore, illustrated here.

Figure 14:
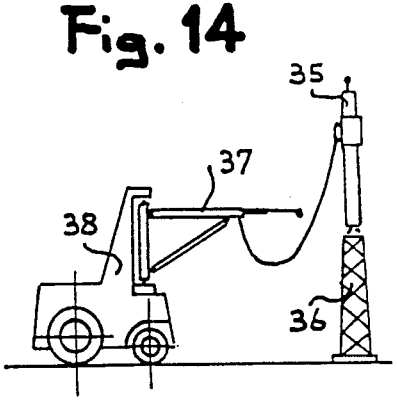

In FIGS. 13 and 14 is illustrated the use of the washing equipment according to the invention, in the case of a column insulator 35, e.g. a station insulator, mounted on a base 36, the height of which is generally not over 3 meters. In this case, a bracket 37, substantially identical with the bracket 32 of FIG. 10, is mounted on a service carriage 38. After positioning of the carriage 38 near to base the 36, the bracket 37 and its telescopic arm 39 are moved until the group 3 is led into engagement with the column 35, as already seen (FIG. 13). The engagement having been performed, the arm 39 withdraws (FIG. 14) and the washing operation can be initiated, which is simpler in this case, owing to the engagement taking place directly at the lower end of column 35. The operation can be resumed as follows:

engagement of group 3 at the base of insulator 35 ascent of group 3 to the top of the insulator, with lower washing nozzles being activated partial descent of group 3, with deactivated lower nozzles and activated upper nozzles, for a section of the insulator corresponding substantially to the height of the same group 3 full descent of group 3 to the base of the insulator, with all washing nozzles being deactivated release of group 3 from the insulator.

Figure 15:
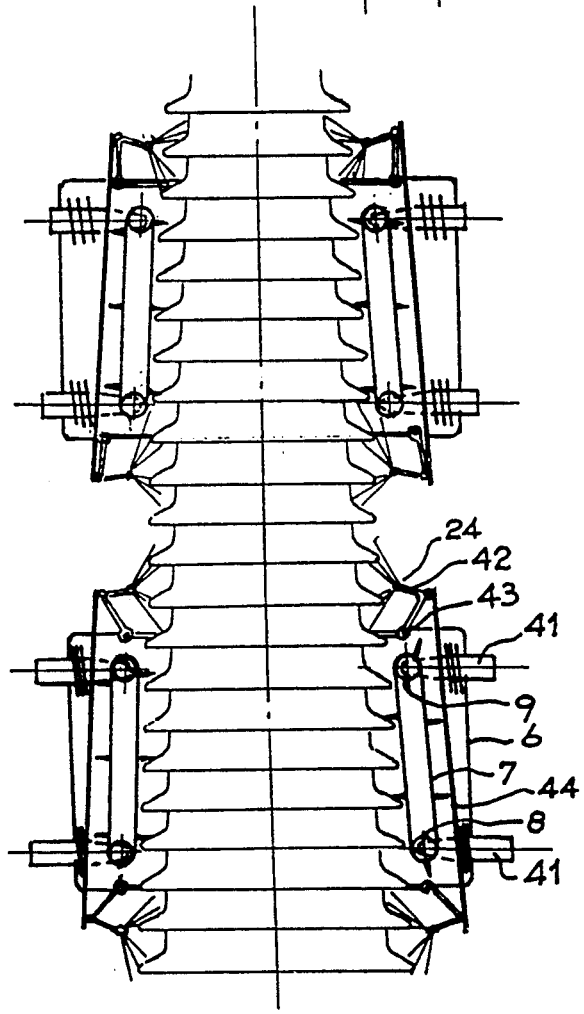
FIG. 15 shows, to an enlarged scale, a different embodiment of the washing assembly of the invention at work on a cone-shaped insulator.

The alternative embodiment shown in FIG. 15 is specifically provided for the washing of insulators having a truncated-cone shape, such as the bushing insulators of transformation stations. The same embodiment can also be utilized for the column insulators having a section which is not constant throughout their height.

According to this embodiment of the present invention, the guide body 6 is wide enough to embrace the insulator 40 in its part having the greatest diameter (position D). The tracks 7 are mounted on transmission rollers 8, 9, the supporting pins of which are mounted on slides 41 movable radially with respect to the body 6. Spring means, apt to perform a pushing action towards the central axis X—X of the insulator 40, acts on the slides 41. In this way, the tracks 7, and similarly the guiding bars 12, 13 too, are pushed constantly into contact with the outer surface of insulator 40, whatever its taper may be, the distance between the two tracks and their convergent arrangement fitting automatically with the shape of the insulator during the movement of the body 6 along the insulator 40 (position E).

In this embodiment, the spraying nozzles 24 are in turn mounted on floating arms 42, hinged in 43 on the guide body 6; the position of these arms with respect to the insulator 40 is controlled through rods 44, which are in turn mounted on the slides 41.

In an alternative embodiment (not shown) the pins of the transmission rollers 8, 9, as well as the nozzles 24, could be mounted on laterally movable slides; position control means are also provided to positively control the movement of said slides, said control means being associated with a feeler suitable to detect, point by point, the diameter of the insulator 40, during the movement of the body 6. A solution like this need not being illustrated in detail, because it is widely known to those skilled in the art how to transform a mechanical structure like that illustrated in FIG. 15 into a structure based on electronic control actuators and position sensors.

It is of interest to note that in the case of an insulator like that of FIG. 15, in which the height dimensions of the single insulator elements are very reduced, the distance between the tongue teeth 7a of the tracks 7 is preferably equal to a whole multiple of the distance between said single insulator elements.

As it can be easily understood, the advantages of the equipment according to the invention with respect to the prior art are considerable, both regarding the possibility to perform washing practically on every known configuration of large-dimensioned insulators or insulator chains, and regarding the fact that no limitation exists, even regarding the mounting arrangement of the insulators, viz., horizontal, skew, vertical, V-shaped or bent. Moreover, the washing is perfectly ensured throughout the length of the insulators, without any risk of electric discharges.

However, it is understood that the invention is not limited to the particular embodiments heretofore illustrated and described, but several different embodiments could be carried out, all being within the capacity of those skilled in the art and within the scope of this invention.

I claim:

1. Equipment to carry out maintenance operations on insulator chains of high voltage electric lines of the type having a guide body displaceable along the insulator chain, and means to displace the guide body along a length of the insulator chain, the displacement means having at least one track revolving on two transmission rollers, at least one of which is motor-driven, the length of the track being in contact with a peripheral edge of the insulators of the chain, characterized in that:

the track includes a plurality of tongue teeth projecting generally perpendicularly from an outer surface of the track for engagement with the chain insulators;

the guide body and the track collectively comprising a plurality of contact points with the periphery of each insulator, said contact points being distributed over the contour of the insulators; and in that said guide body comprises means for operating the guide body along the track, said guide body operating means being remote-controlled and/or programmed.

2. Equipment as in claim 1, characterized in that said guide body operating means is supplied with an insulating fluid, the equipment further comprising a control unit coupled to said guide body by a flexible pipe of insulating material for receiving therethrough passage of the insulating fluid.

3. Equipment as in claim 2, wherein said insulating fluid comprises motor hydraulic fluid and said guide body displacing means comprise a hydraulic motor, fed with said insulating motor hydraulic fluid through said insulating pipe.

4. Equipment as in claim 1, wherein said insulating fluid comprises a washing fluid and said operating means comprise washing means, fed with said insulating washing fluid through said insulating pipe.

5. Equipment as in claim 1, wherein said guide body includes a side and a base and has a configuration essentially closed on the side so as to substantially surround the insulator chain, and open at the base, said body comprising a first part surrounding at least half of the chain, and at least one movable part surrounding the remaining part of the chain and being hinged to the first part, the movable part being hingedly pivotable with respect to said first part to allow lateral access of the chain.

6. Equipment as in claim 5, wherein the movable part comprises first and second hingedly coupled, displaceable members.

7. Equipment as in claim 5, providing for at least two guide bars, positioned axially on an inner wall of the guide body for, together with said at least one tracks, centering of the guide body on the insulator chain, one of said guide bars being associated to one of said at least one movable parts of the guide body.

8. Equipment as in claim 1, providing for at least two tracks, positioned on diametrically opposite sides in respect of the insulator chain, each of said tracks being mounted revolving on a pair of driving rollers mounted on pins carried by said guide body.

9. Equipment as in claim 8, wherein said pins supporting the driving rollers for said tracks are mounted radially movable on said guide body, means being further provided to push said pins towards the axis of the insulator chain.

10. Equipment as in claim 8, comprising at least one driving motor for effecting rotation of at least one of the driving rollers for said tracks, said driving motor being a hydraulic motor operable with an insulating fluid selected from the group consisting of oil, demineralized water and air.

11. Equipment as in claim 1, wherein said guide body comprises a support upright, clamping means being moreover provided to clamp said support upright for supporting and transferring said guide body relative to an insulator chain.

12. Equipment as in claim 11, wherein to said support upright there is associated at least one control lever and a transmission between said lever and one of the movable parts of said guide body, said lever being operated by said clamping means to control movement of said movable parts through said transmission.

13. Equipment as in claim 1, wherein said operating means comprise a plurality of spray nozzles for spraying washing liquid, said spray nozzles being positioned adjacent to each end of said guide body.

14. Equipment as in claim 13, wherein said spray nozzles are mounted on two tubular distribution rings, fixed at the two ends of the guide body, said nozzles being distributed over the whole contour of the rings.

15. Equipment as in claim 14, wherein said distribution rings have an opening to allow passage of the insulator chain therethrough.

16. Equipment as in claim 14, wherein said distribution rings are each formed of a fixed part and of at least one movable part, said movable part being hinged onto the fixed part and being at least partially flexible.

17. Equipment as in claim 13, wherein said spray nozzles are mounted on the ends of movable arms, oscillating around vertical pins carried by two tubular distribution rings fixed at the two ends of the guide body, the oscillation of said arms causing the nozzles to run along an arc which passes through an internal space between two insulators of the chain.

18. Equipment as in claim 17, wherein the oscillation of said movable arms is controlled by a hydraulic motor driven by the pressurized washing liquid.

19. Equipment as in claim 13, wherein said spray nozzles are mounted radially movable in respect of the guide body, there being associated with said spray nozzles means for connecting the spray nozzles to said movable pins supporting the driving rollers.

20. Equipment as in claim 1 wherein, to a lower end of the guide body, there is associated an annular gutter to collect washing liquid applied to an insulator chain, said gutter having a diameter wider than that of the widest diameter of the insulator chain, said gutter having an inner edge with which are associated flexible collecting tongues.

21. Equipment as in claim 1, characterized in that it also comprises a movable bracket, a support arm sliding in respect of the bracket, and a clamping gripper mounted at the end of said bracket arm for clamping and supporting said guide body, control means being provided to control movement of said bracket, said bracket arm and said gripper so as to lead the guide body into engagement with an insulator chain and to release it therefrom.

22. Equipment as in claim 21, wherein said bracket is mounted on a service car that is displaceable relative to said insulator chain.

* * * * *